United States Patent
Tanabe et al.

(10) Patent No.: US 11,370,494 B2
(45) Date of Patent: Jun. 28, 2022

(54) SIDE BRACKET

(71) Applicants: FUTABA INDUSTRIAL CO., LTD., Aichi (JP); TOYOTA JIDOSHA KABUSHIKI KAISHA, Aichi (JP)

(72) Inventors: Masatoshi Tanabe, Aichi (JP); Daisuke Setoguchi, Aichi (JP)

(73) Assignees: FUTABA INDUSTRIAL CO., LTD., Aichi (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 245 days.

(21) Appl. No.: 16/775,770

(22) Filed: Jan. 29, 2020

(65) Prior Publication Data

US 2020/0247475 A1 Aug. 6, 2020

(30) Foreign Application Priority Data

Feb. 1, 2019 (JP) .............................. JP2019-017204

(51) Int. Cl.
*B62D 25/08* (2006.01)
*B62D 25/14* (2006.01)
*B62D 1/02* (2006.01)

(52) U.S. Cl.
CPC ........... *B62D 25/08* (2013.01); *B62D 25/145* (2013.01); *B62D 1/02* (2013.01)

(58) Field of Classification Search
CPC ........ B62D 25/145; B62D 25/08; B62D 1/02; B62D 1/16; B62D 7/16; B60R 21/205; B60D 21/00
See application file for complete search history.

(56) References Cited

U.S. PATENT DOCUMENTS

| | | | | |
|---|---|---|---|---|
| 4,826,234 A | * | 5/1989 | Komatsu | B62D 25/081 296/70 |
| 5,431,442 A | * | 7/1995 | Tomita | B60R 7/06 180/90 |
| 6,179,372 B1 | * | 1/2001 | Sakamoto | B62D 25/082 296/203.02 |

(Continued)

FOREIGN PATENT DOCUMENTS

| | | |
|---|---|---|
| JP | 2002284036 A | 10/2002 |
| JP | 2007314031 A | 12/2007 |
| JP | 2008030679 A | 2/2008 |

*Primary Examiner* — Paul N Dickson
*Assistant Examiner* — Tiffany L Webb
(74) *Attorney, Agent, or Firm* — David D. Brush; Westman, Champlin & Koehler, P.A.

(57) ABSTRACT

A side bracket includes at least one body fastening portion to be fastened to a body of a vehicle, an inner fastening portion, an outer fastening portion, an inner joining part, and an outer joining part. The inner joining part is provided in a rim surrounding a through hole in the inner fastening portion, and in a position closer to a central side in a vehicle-width direction than at least one body fastening portion, the inner joining part is joined to an outer circumferential surface of the steering member penetrating the through hole. The outer joining part is provided in the outer fastening portion, and in a position closer to an end side in the vehicle-width direction than at least one body fastening portion, the outer joining part is joined to a front portion of the outer circumferential surface of the steering member.

15 Claims, 4 Drawing Sheets

(56) References Cited

U.S. PATENT DOCUMENTS

| | | | |
|---|---|---|---|
| 6,736,439 B2* | 5/2004 | Yasuta | B60H 1/0055 296/72 |
| 9,499,212 B2* | 11/2016 | Yoshida | B62D 27/023 |
| 2007/0262613 A1* | 11/2007 | Meier | B62D 25/145 296/192 |
| 2017/0349210 A1* | 12/2017 | Kong | B62D 29/008 |
| 2018/0072351 A1* | 3/2018 | Kaneko | B62D 25/145 |

* cited by examiner

SIDE BRACKET

CROSS-REFERENCE TO RELATED APPLICATIONS

This application claims the benefit of Japanese Patent Application No. 2019-017204 filed on Feb. 1, 2019 with the Japan Patent Office, the entire disclosure of which is incorporated herein by reference.

BACKGROUND

The present disclosure relates to a side bracket to fasten a steering member supporting steering to a body of a vehicle.

In the technique disclosed in Japanese Unexamined Patent Application Publication No. 2008-030679, an end of a steering member is held between a bracket fastened to a front pillar and a reinforcing bracket from the top and the bottom. And, by fixing these brackets to a body of a vehicle with bolts, both ends of the steering member are fastened to the body of the vehicle. This improves stiffness of a fastening portion with the body in the steering member.

SUMMARY

However, in the technique disclosed in Japanese Unexamined Patent Application Publication No. 2008-030679, the end of the steering member is fastened to the bracket at one position. Thus, a fastening portion of the bracket with the steering member may not exhibit sufficient stiffness (hereinafter, referred to as a twisting stiffness) against force occurred when the steering member is twisted.

In one aspect of the present disclosure, it is preferable to improve the twisting stiffness in the fastening portion of a side bracket with the steering member.

One aspect of the present disclosure is to provide a side bracket configured to fasten an end of a steering member to a body of a vehicle, the steering member being a stick member mounted on the vehicle with the steering member extending in a vehicle-width direction to support steering. The side bracket includes a base, an inner fastening portion, an outer fastening portion, an inner joining part, and an outer joining part. The base has at least one body fastening portion configured to be fastened to the body. The inner fastening portion extends from the base toward a rear side, the inner fastening portion having a through hole configured to be penetrated by the steering member. The outer fastening portion extends from the base toward the rear side. The inner joining part is provided on a rim surrounding the through hole in the inner fastening portion so as to surround the through hole, wherein in a position closer to a central side in the vehicle-width direction than the at least one body fastening portion, the inner joining part is configured to be joined to an outer circumferential surface of the steering member penetrating the through hole. The outer joining part is provided on the outer fastening portion, wherein in a position closer to an end side in the vehicle-width direction than the at least one body fastening portion, the outer joining part is configured to be joined to a front portion of the outer circumferential surface of the steering member penetrating the through hole.

In the above configuration, the end of the steering member is joined to the outer joining part and the inner joining part that is positioned on the central side in the vehicle-width direction of the outer joining part. The outer joining part can be joined to the front portion of the outer circumferential surface of the steering member. The inner joining part can be joined to the outer circumferential surface of the steering member while surrounding the outer circumferential surface. That is, the inner joining part positioned on the central side in the vehicle-width direction can be more firmly joined to the steering member than the outer joining part. This improves stiffness (hereinafter, referred to as a twisting stiffness) against force occurred when the steering member is twisted in the fastening portion of the side bracket with the steering member.

In one aspect of the present disclosure, the inner joining part may be a flange portion.

With the above configuration, a structure of the inner joining part can be simplified, thereby reducing the manufacturing cost and weight of the side bracket.

In one aspect of the present disclosure, the inner joining part may protrude from the rim surrounding the through hole in the inner fastening portion toward the central side in the vehicle-width direction.

With the above configuration, the steering member is joined to the side bracket at a position closer to the central side in the vehicle-width direction. This improves the twisting stiffness in the fastening portion of the side bracket with the steering member.

In one aspect of the present disclosure, the outer joining part may be a flange portion.

With the above configuration, the structure of the outer joining part can be simplified, thereby reducing the manufacturing cost and weight of the side bracket.

In one aspect of the present disclosure, the inner fastening portion may have a front section and a rear section. The front section is arranged on the front side of the steering member penetrating the through hole. The rear section is arranged on a rear side of the steering member. In the front section, a first front attaching part, a second front attaching part, and a front joining part positioned between the first front attaching part and the second front attaching part may be provided. In the rear section, a first rear attaching part, a second rear attaching part, and a rear joining part positioned between the first rear attaching part and the second rear attaching part may be provided. By joining the first front attaching part and the first rear attaching part and by joining the second front attaching part and the second rear attaching part, the through hole may be formed between a pair of the first front attaching part and the first rear attaching part and a pair of the second front attaching part and the second rear attaching part, and the inner joining part may be formed by the front joining part and the rear joining part.

With the above configuration, the steering member is held between the front section and the rear section from the front and the rear, and the steering member can be arranged in the through hole by joining the first front attaching part and the first rear attaching part and by joining the second front attaching part and the second rear attaching part. This reduces the workload to join the side bracket and the steering member.

In one aspect of the present disclosure, the first front attaching part, the second front attaching part, the first rear attaching part, and the second rear attaching part may be flange portions.

With the above configuration, the structures of the first front attaching part, the second front attaching part, the first rear attaching part, and the second rear attaching part can be simplified, thereby reducing the manufacturing cost and weight of the side bracket.

In one aspect of the present disclosure, the first front attaching part, and the second front attaching part may protrude from the front section toward the central side in the vehicle-width direction. The first rear attaching part and the second rear attaching part may protrude from the rear section toward the central side in the vehicle-width direction.

With the above configuration, these attachment parts can be favorably joined together.

In one aspect of the present disclosure, a straight line passing through a substantially center of a cross section orthogonal to the vehicle-width direction in the steering member may be defined as an axis. A surface extending in an up-down direction and including the axis may be defined as a reference surface. The front joining part may be configured to be joined to the outer circumferential surface of the steering member in a portion closer to the front side than the reference surface. The rear joining part may be configured to be joined to the outer circumferential surface of the steering member in a portion closer to the rear side than the reference surface.

With the above configuration, the steering member can be suitably arranged in the through hole of the side bracket.

In one aspect of the present disclosure, the base may have at least two body fastening portions including an upper side body fastening portion and a lower side body fastening portion. The upper side body fastening portion may be positioned on an upper side of the steering member penetrating the through hole in the inner fastening portion, and the lower side body fastening portion may be positioned on a lower side of the steering member.

With the above configuration, the side bracket can be more firmly fastened to the body of the vehicle.

In one aspect of the present disclosure, the front section of the inner fastening portion, the base, and the outer fastening portion may be formed by one plate material, and the rear section of the inner fastening portion may be formed by one plate material.

With the above configuration, a structure of the side bracket can be simplified and the manufacturing cost and weight of the side bracket can be reduced.

In one aspect of the present disclosure, the inner fastening portion may be a plate-like portion substantially orthogonal to the vehicle-width direction.

With the above configuration, the steering member can be favorably fastened to the body of the vehicle.

In one aspect of the present disclosure, the outer fastening portion may be a plate-like portion substantially orthogonal to the vehicle-width direction.

With the above configuration, the steering member can be favorably fastened to the body of the vehicle.

BRIEF DESCRIPTION OF THE DRAWINGS

Exemplary embodiments of the present disclosure will be described hereinafter by way of example with reference to the accompanying drawings, in which.

DETAILED DESCRIPTION OF EXEMPLARY EMBODIMENTS

The embodiment of the present disclosure is not limited to the following embodiments, and can be variously modified within the technical scope of the present disclosure.

1. Overview

Figure 1:
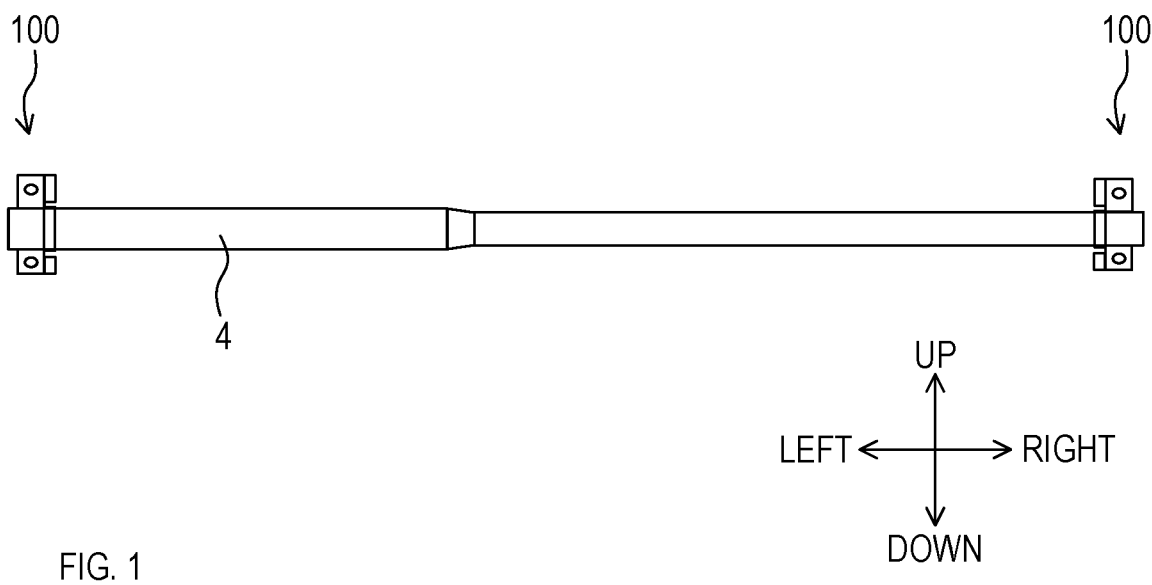
FIG. 1 is a rear view of a steering member and a side bracket.
Figure 2:
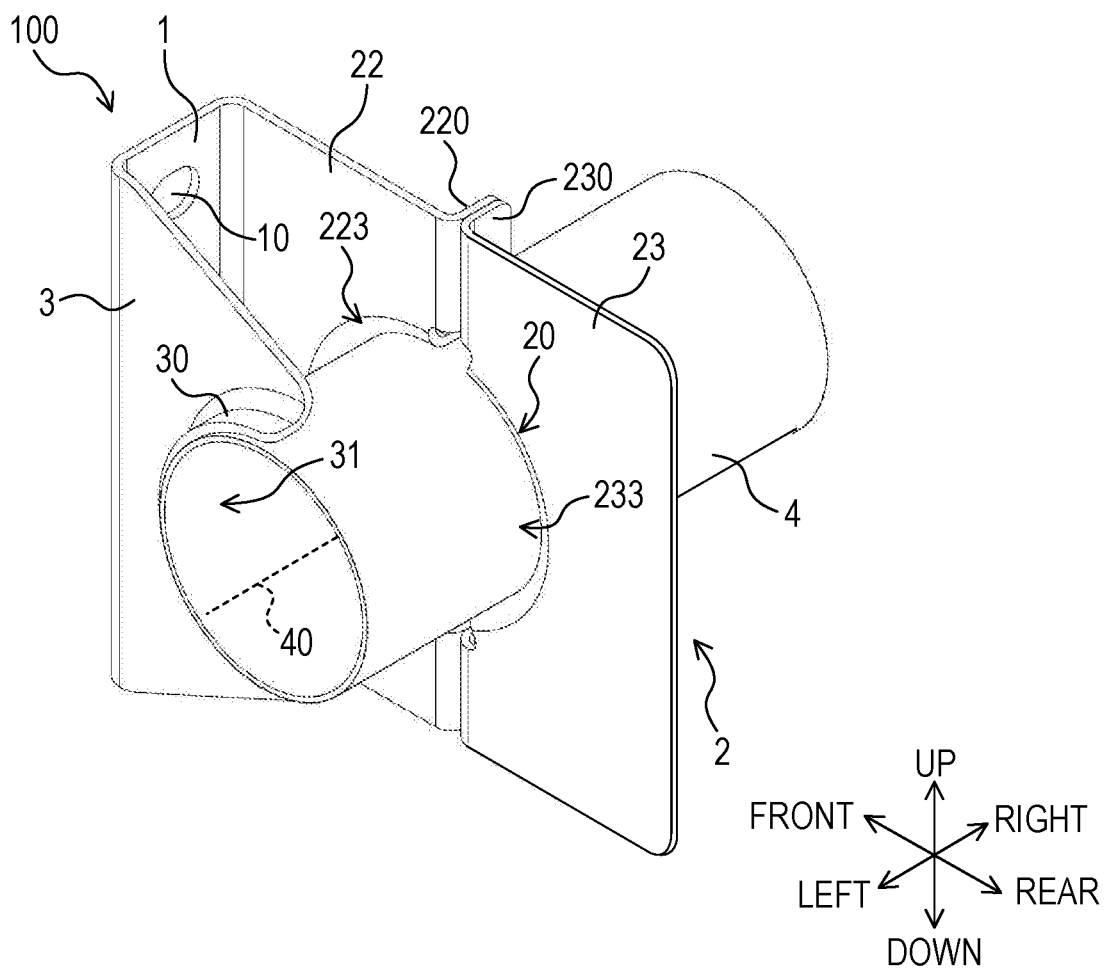
FIG. 2 is a perspective view of the side bracket.
Figure 3:
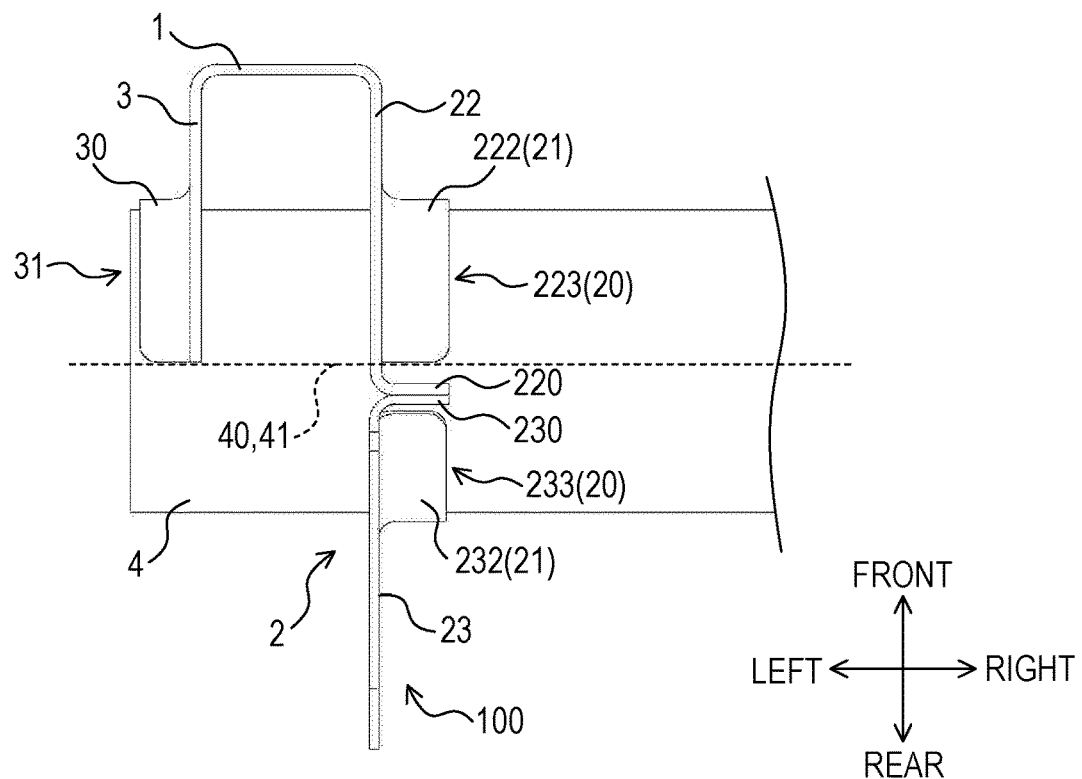
FIG. 3 is a plan view of the side bracket.

A side bracket 100 of the present embodiment is provided on each end of a steering member 4 mounted on a vehicle, and the side bracket 100 fastens the end of the steering member 4 to the body of the vehicle (see FIG. 1). The steering member 4 is mounted on the vehicle with the steering member extending in a right-left direction (in other words, in a vehicle-width direction) to support steering of the vehicle from above. The steering member 4 is a pipe member having a first portion, a second portion thinner than the first portion, and a reduced diameter portion connecting between the first portion and the second portion. These portions have a substantially circular cross section orthogonal to the right-left direction.

Hereinafter, a front side and rear side of the vehicle are simply described as a front side and a rear side. A right side and left side toward the front are simply described as a right side and a left side. Hereinafter, a configuration of the side bracket 100 provided on a left end of the steering member 4 will be described in detail. The side bracket 100 has a base 1, an inner fastening portion 2, an outer fastening portion 3, an inner joining part 21, and an outer joining part 30 (see FIGS. 2 to 7).

2. Base

The base 1 is a rectangular plate-like portion to fasten the side bracket 100 to the body of the vehicle. The base 1 is fastened to the body of the vehicle with a long side rim of the base 1 extending in an up-down direction and a short side rim of the base 1 extending in the right-left direction (see FIGS. 2 to 7). The base 1 has at least an upper side body fastening portion 10 and a lower side body fastening portion 11 (see FIGS. 2, 5, and 7).

Each of the upper side body fastening portion 10 and the lower side body fastening portion 11 is, as one example, formed into a hole to insert a bolt, and the base 1 is fastened to the body by the bolts. As one example, the upper side body fastening portion 10 is positioned on an upper side of the steering member 4 that is mounted on the vehicle with the steering member 4 penetrating through a through hole 20 of the inner fastening portion 2, which will be described later. The lower side body fastening portion 11 is positioned on a lower side of the steering member 4. More specifically, the upper side body fastening portion 10 is positioned near an upper rim of the base 1, and the lower side body fastening portion 11 is positioned near a lower rim of the base 1. It should be noted that the base 1 may be fastened to the body of the vehicle by one body fastening portion or three or more body fastening portions.

3. Inner Fastening Portion

The inner fastening portion 2 is a plate-like portion extending from a position on the right side of the upper and lower side body fastening portions 10, 11 in the base 1 (in other words, a central side in the vehicle-width direction) toward the rear side (see FIGS. 2 to 7). More specifically, the inner fastening portion 2 extends from a long side right rim of the base 1 toward the rear side, and the inner fastening portion 2 is arranged substantially orthogonal to the right-left direction. Also, the inner fastening portion 2 has a through hole 20 and the inner joining part 21.

The through hole 20 is positioned on the right side of the upper and lower side body fastening portions 10, 11, and penetrated by the steering member 4 mounted on the vehicle with the steering member 4 extending in the right-left direction. Also, as one example, the through hole 20 is formed into a substantially circular shape.

The inner joining part 21 is provided on a rim surrounding the through hole 20 in the inner fastening portion 2. The inner joining part 21 is a flange portion protruding from the rim toward the right side, for example. The inner joining part 21 may protrude from the rim toward the left side. The inner joining part 21 is arranged so as to surround the through hole 20. In other words, the inner joining part 21 is arranged so as to surround an outer circumferential surface of the steering member 4 penetrating the through hole 20. Also, the inner joining part 21 is positioned on the right side of the upper and lower side body fastening portions 10, 11. The inner joining part 21 is welded on the outer circumferential surface. The inner joining part 21 may be welded, for example, along a path extending around the outer circumferential surface.

More specifically, the inner fastening portion 2 has a front section 22, a rear section 23, a first attaching part 220, a second front attaching part 221, a front joining part 222, a first rear attaching part 230, a second rear attaching part 231, and a rear joining part 232.

4. Front Section

The front section 22 is a plate-like portion extending from the long side right rim of the base 1 toward the rear side (see FIGS. 2 to 7). The front section 22 is arranged on the front side of the steering member 4 penetrating the through hole 20 so as to be substantially orthogonal to the right-left direction. Also, the front section 22 has a semicircular front cutout 223 formed in a rear side rim of the front section 22.

The first and second front attaching parts 220, 221 are flange portions provided in the rear side rim of the front section 22, and the first and second front attaching parts 220, 221 protrude from the rear side rim toward the right side, for example. The first front attaching part 220 is positioned on the upper side of a front cutout 223. The second front attaching part 221 is positioned on a lower side of the front cutout 223. The first and second front attaching parts 220, 221 extends straight in the up-down direction.

The front joining part 222 is a flange portion provided along a rim adjacent to the front cutout 223 in the front section 22, and the front joining part 222 protrudes from the rim toward the right side, for example. The front joining part 222 is positioned between the first front attaching part 220 and the second front attaching part 221.

5. Rear Section

The rear section 23 is a plate-like portion arranged on the rear side of the steering member 4 penetrating the through hole 20 so as to be substantially orthogonal to the right-left direction (see FIGS. 2 to 6). The rear section 23 has a semicircular rear cutout 233 formed in a front side rim of the rear section 23.

The first and second rear attaching parts 230, 231 are flange portions provided in the front side rim of the rear section 23, and the first and second rear attaching parts 230, 231 protrude from the front side rim toward the right side, for example. The first rear attaching part 230 is positioned on the upper side of the rear cutout 233, and the second rear attaching part 231 is positioned on the lower side of the rear cutout 233. The first and second rear attaching parts 230, 231 extends straight in the up-down direction.

The rear joining part 232 is a flange portion provided along a rim adjacent to the rear cutout 233 in the rear section 23, and the rear joining part 232 protrudes from the rim toward the right side, for example. The rear joining part 232 is positioned between the first rear attaching part 230 and the second rear attaching part 231.

6. Joining of Front Section and Rear Section

The first front attaching part 220 of the front section 22 and the first rear attaching part 230 of the rear section 23 are welded, and the second front attaching part 221 of the front section 22 and the second rear attaching part 231 of the rear section 23 are welded, thereby forming the inner fastening portion 2 (see FIGS. 2 to 4, and 6). Specifically, in a state where the steering member 4 is placed in the front cutout 223 of the front section 22 and the rear cutout 233 of the rear section 23, the first front attaching part 220 and the first rear attaching part 230 are brought into contact with each other, and the second front attaching part 221 and the second rear attaching part 231 are brought into contact with each other.

At that time, the through hole 20 is formed by the front cutout 223 and the rear cutout 233 that are combined between a pair of the first front side attachment part 220 and the first rear side attachment part 230 and a pair of the second front side attachment part 221 and the second rear side attachment part 231. Then, the steering member 4 is brought into a state of penetrating the through hole 20, and the steering member 4 is held between the front joining part 222 and the rear joining part 232 from the front and the rear. The front joining part 222 and the rear joining part 232 extend along a rim of the through hole 20, and thus surround the outer circumferential surface of the steering member 4. In other words, the front joining part 222 and the rear joining part 232 form the inner joining part 21.

Then, the first front attaching part 220 and the first rear attaching part 230 are welded, and the second front attaching part 221 and the second rear attaching part 231 are welded. It is to be noted that these attachment parts may be welded from one end to the other end in the up-down direction. Also, the front joining part 222 and the rear joining part 232 are welded on the outer circumferential surface of the steering member 4. These joining parts may be welded from one end to the other end along the rim of the through hole 20.

Figure 4:
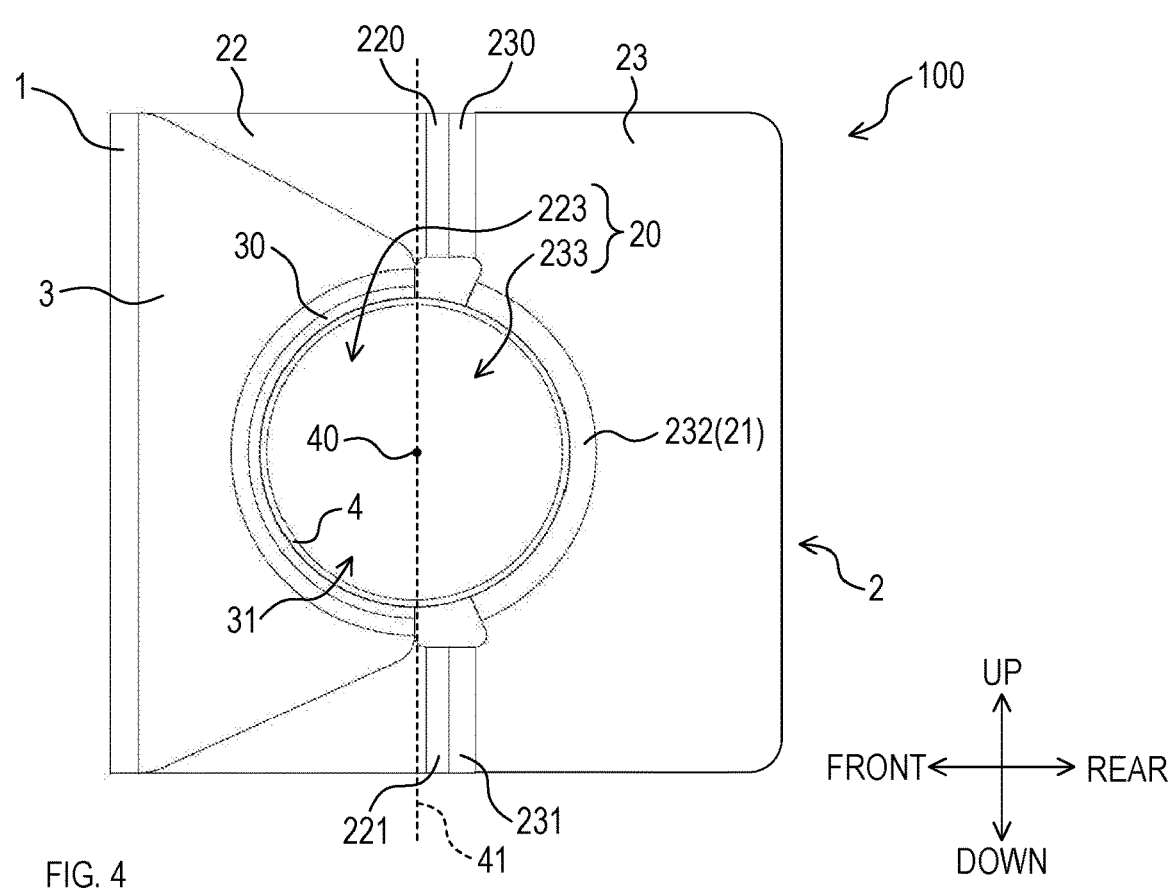
FIG. 4 is a left view of the side bracket.
Figure 5:
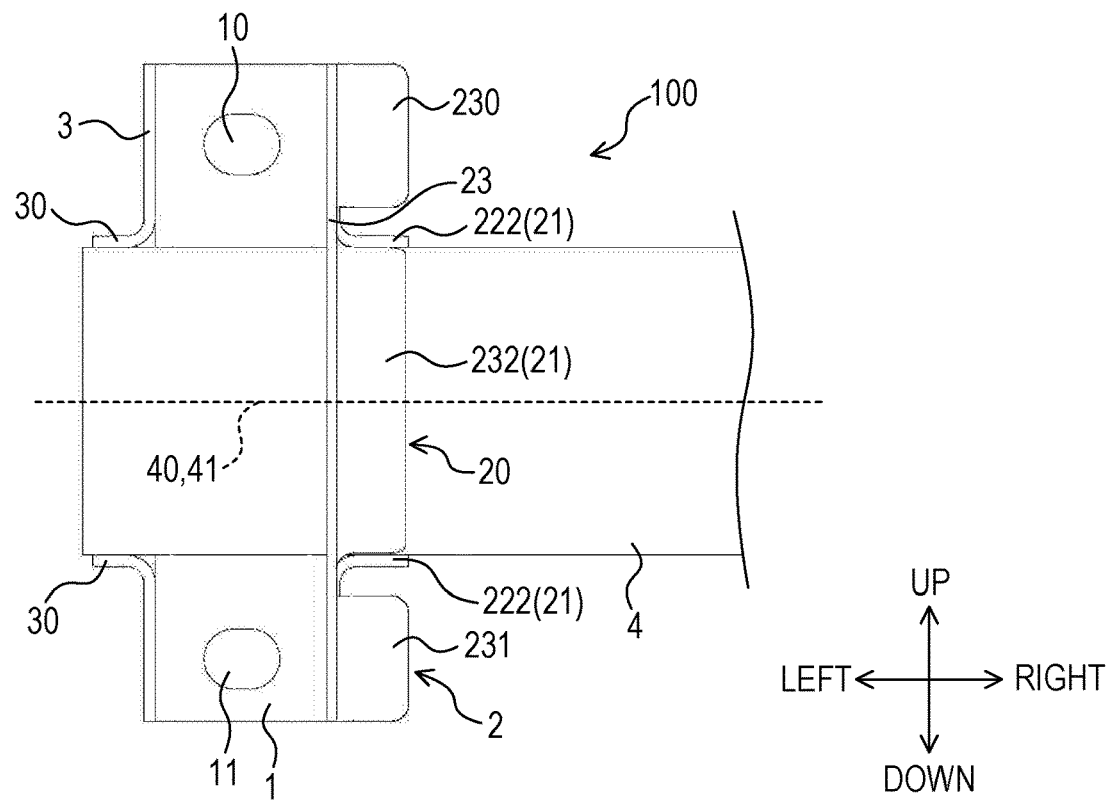
FIG. 5 is a rear view of the side bracket.
Figure 6:
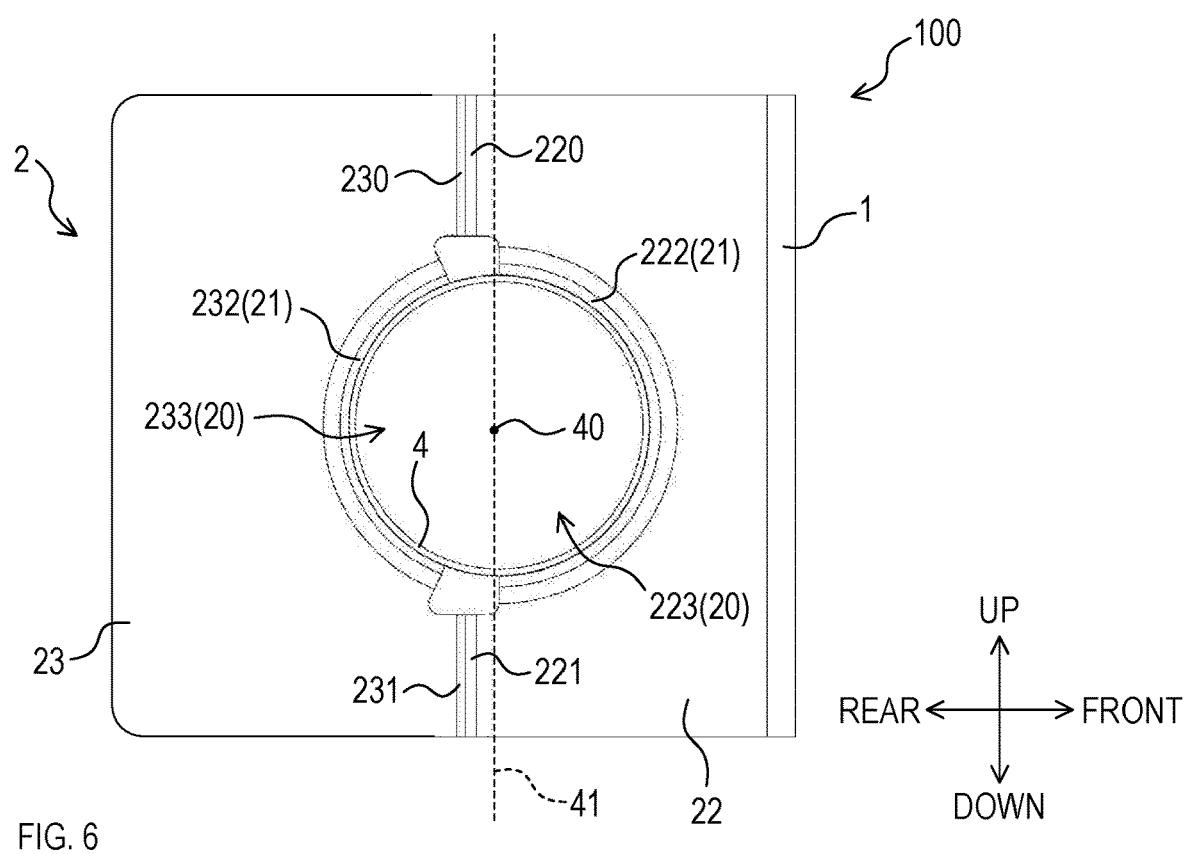
FIG. 6 is a right view of the side bracket.
Figure 7:
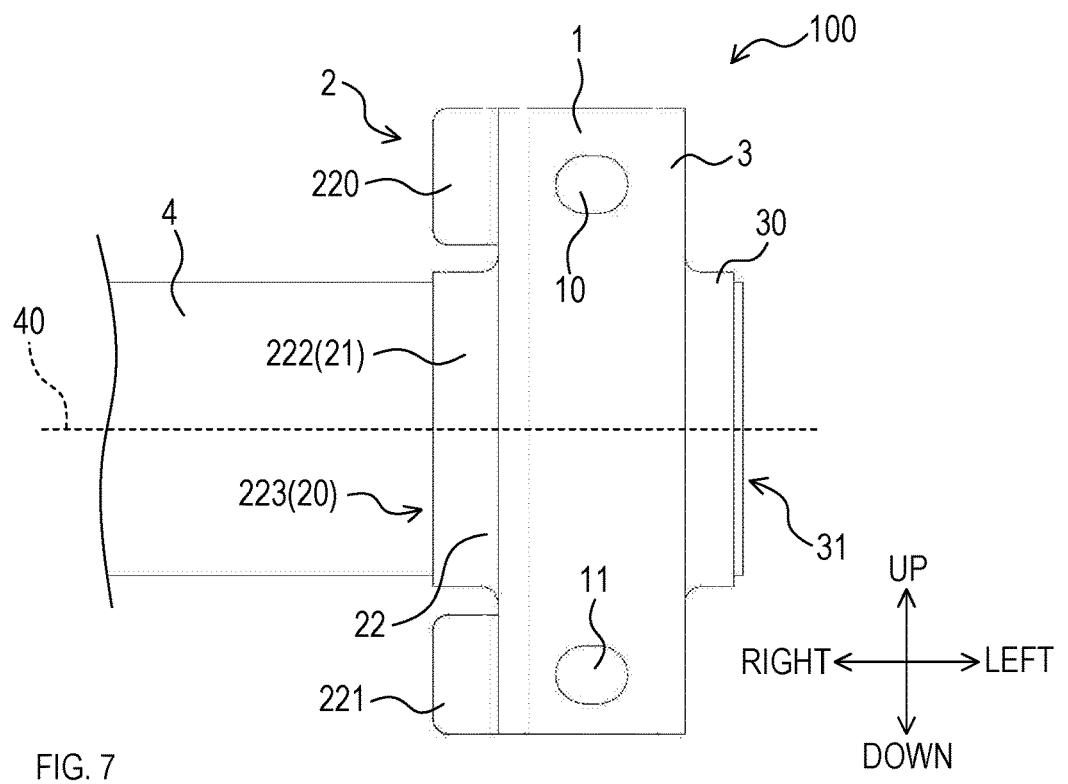
FIG. 7 is a front view of the side bracket.

Here, an axis 40 is defined as a virtual straight line passing through a substantially center of the cross section orthogonal to the right-left direction in an area where the steering member 4 is fastened by the side bracket 100. Also, a reference surface 41 is defined as a virtual surface extending in the up-down direction and including the axis 40. As shown in FIGS. 4 and 6, the front joining part 222 is welded on the outer circumferential surface of the steering member 4 in a portion closer to the front side than the reference surface 41. Also, the rear joining part 232 is welded on the outer circumferential surface in a portion closer to the rear side than the reference surface 41.

Figure 8:
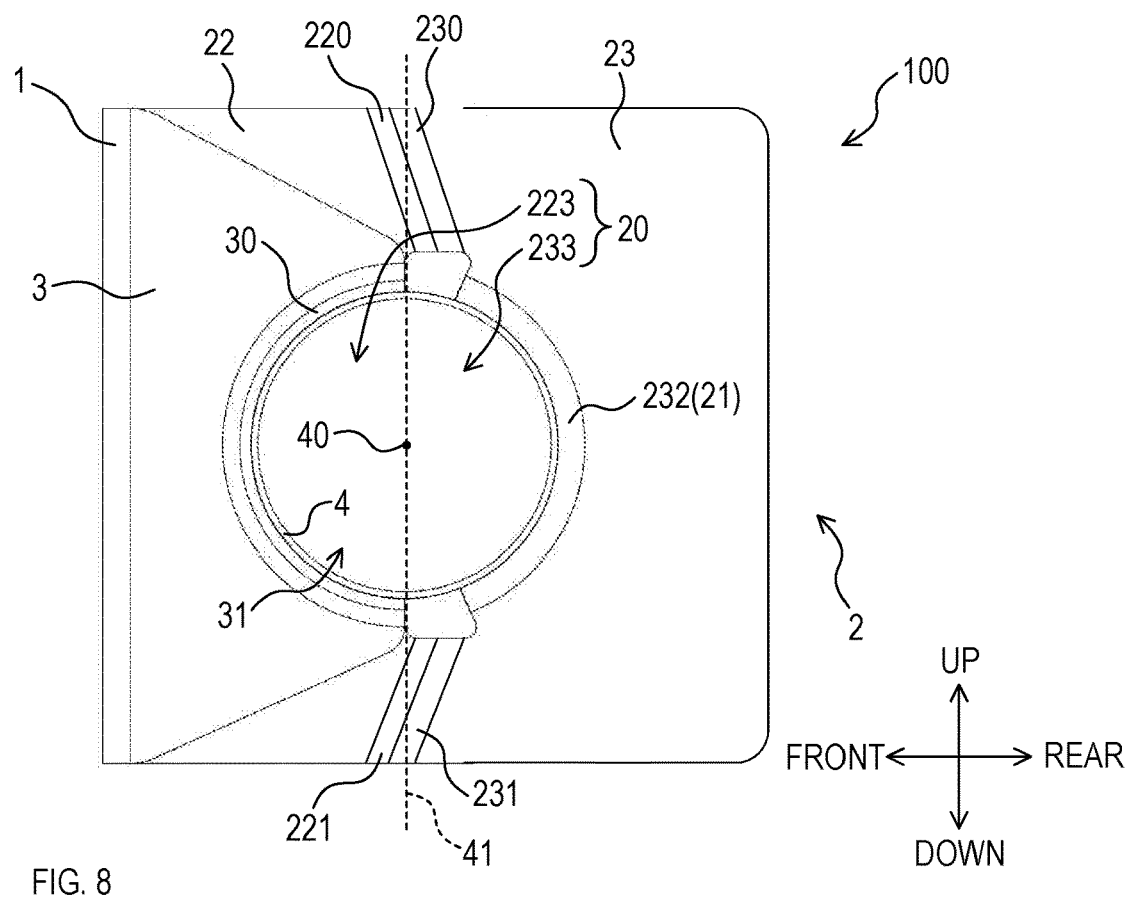
FIG. 8 is a left view of a side bracket in a modified example.

When the inner fastening portion 2 is formed by the front section 22 and the rear section 23, the first and second front attaching parts 220, 221 and the first and second rear attaching parts 230, 231 extend straight in the up-down direction. However, these attachment parts may be inclined with respect to the up-down direction. Specifically, for example, as shown in FIG. 8, the first front attaching part 220 and the first rear attaching part 230 may be inclined so as to be closer to the base 1 toward the upper side. Also, the second front attaching part 221 and the second rear attaching part 231 may be inclined so as to be closer to the base 1 toward the lower side.

7. Outer Fastening Portion

The outer fastening portion 3 is a plate-like portion extending from a position on the left side of the upper and lower side body fastening portions 10, 11 in the base 1 (in other words, an end side in the vehicle-width direction of the vehicle) toward the rear side (see FIGS. 2 to 7). More specifically, the outer fastening portion 3 extends from a long side left rim of the base 1 toward the rear side, and the outer fastening portion 3 is arranged substantially orthogonal to the right-left direction. The outer fastening portion 3 has a semicircular cutout 31 formed in the rear side rim of the outer fastening portion 3. The cutout 31 is positioned on the left side of the upper side body fastening portion 10 and the lower side body fastening portion 11. The outer fastening portion 3 has the outer joining part 30.

The outer joining part 30 is a flange portion arranged along a rim adjacent to the cutout 31 in the outer fastening portion 3, and the outer joining part 30 protrude from the rim toward the left side, for example. It is to be noted that the outer joining part 30 may protrude from the rim toward the right side. The outer joining part 30 is positioned on the left side of the upper side body fastening portion 10 and the lower side body fastening portion 11.

The outer joining part 30 is welded on a front portion of the outer circumferential surface of the steering member 4 penetrating the through hole 20. It is to be noted that the outer joining part 30 may be welded on the outer circumferential surface from one end to the other end along the rim of the cutout 31.

8. Other Configuration

The outer fastening portion 3, the base 1, and the front section 22 of the inner fastening portion 2 may be formed by processing one plate material, and the rear section 23 of the inner fastening portion 2 may be formed by processing one plate material. In other words, the side bracket 100 may be formed by two parts composed of one part having the outer fastening portion 3, the base 1, and the front section 22, and the other part having the rear section 23. This simplifies a structure of the side bracket 100.

The side bracket 100 provided on the right end of the steering member 4 has a similar configuration of the above-described side bracket 100 provided on the left end. That is, the right end side bracket 100 also has a base, inner fastening portion, outer fastening portion, inner joining part, outer joining part and the like configured to be similar to the above-described corresponding components. However, a position in the right-left direction of each component in the right end side bracket 100 is opposite to the corresponding component in the left end side bracket 100.

9. Effect (1) According to the aforementioned embodiment, the left end of the steering member 4 is welded on the outer joining part 30 of the side bracket 100 and on the inner joining part 21 positioned on the right side of the outer joining part 30. The outer joining part 30 is welded on a front portion of the outer circumferential surface of the steering member 4. The inner joining part 21 is welded on the outer circumferential surface of the steering member 4 while surrounding the outer circumferential surface. In other words, the inner joining part 21 positioned on the central side in the right-left direction is more firmly joined to the steering member 4 than the outer joining part 30. This improves the twisting stiffness in the fastening portion of the side bracket 100 with the steering member 4 especially in a portion closer to a steering wheel of the vehicle.

(2) In addition, the steering member 4 is welded on the inner joining part 21 that is a flange and provided in the plate-like inner fastening portion 2 extending from the base 1 toward the rear side. The steering member 4 is also welded on the outer joining part 30 that is a flange and provided in the plate-like outer fastening portion 3 extending from the base 1 toward the rear side. This simplifies the structure of the side bracket 100 and make it possible to flexibly adjust a fastening position in the side bracket 100 with the steering member 4. Consequently, even if a position where the side bracket 100 is fastened to the body of the vehicle and a position where the side bracket 100 is fastened to the steering member 4 are spaced apart, it is possible to suitably fasten the steering member 4 to the body of the vehicle while inhibiting the structure of the side bracket 100 from being complicated.

(3) The inner joining part 21 is a flange portion. This simplifies a structure of the inner joining part 21 and reduce the manufacturing cost and weight of the side bracket 100.

(4) The inner joining part 21 protrudes from the rim surrounding the through hole 20 toward the central side in the right-left direction. Thus the steering member 4 is welded on the side bracket 100 at a position closer to the central side in the right-left direction. Consequently, the twisting stiffness in the fastening portion of the side bracket 100 with the steering member 4 improves.

(5) The outer joining part 30 is a flange portion. This simplifies a structure of the outer joining part 30, and reduce the manufacturing cost and weight of the side bracket 100.

(6) The inner joining part 21 has the front section 22 and the rear section 23. The steering member 4 is held between the front section 22 and the rear section 23 from the front and the back, then the first front attaching part 220 and the second front attaching part 221 are welded and the first rear attaching part 230 and the second rear attaching part 231 are welded, thereby arranging the steering member 4 in the through hole. This reduces a workload to join the side bracket 100 and the steering member 4.

(7) The front joining part 222 is welded on the outer circumferential surface of the steering member 4 in a portion closer to the front side than the reference surface 41. Also, the rear joining part 232 is welded on the outer circumferential surface of the steering member 4 in a portion closer to the rear side than the reference surface 41. Thus, the steering member 4 can be suitably arranged in the through hole 20.

(8) The base 1 is fastened to the body of the vehicle by the upper side body fastening portion 10 positioned on the upper side of the steering member 4 and by the lower side body fastening portion 11 positioned on the lower side of the steering member 4. Thus, the side bracket 100 can be more firmly fastened to the body of the vehicle.

10. Other Embodiments (1) In the aforementioned embodiment, the inner fastening portion 2 has the front section 22 and the rear section 23.

By welding the front section 22 and the rear section 23, the through hole 20 and the inner joining part 21 are formed. However, the configuration is not limited to this, and the inner fastening portion 2 may be formed by welding three or more sections, or the inner fastening portion 2 may be formed by one plate-like section. In addition, the inner fastening portion 2 may be formed by first making the through hole 20 in the one plate-like section and then applying burring to the through hole 20.

(2) In the aforementioned embodiments, the inner fastening portion 2 is formed by welding the front section 22 and the rear section 23. However, the inner fastening portion 2 may be formed by joining the front section 22 and the rear section 23 using a method other than the welding. In the aforementioned embodiments, the inner joining part 21 and the outer joining part 30 are welded on the outer circumferential surface of the steering member 4. However, the inner joining part 21 and the outer joining part 30 may be joined to the outer circumferential surface of the steering member 4 by a method other than the welding.

(3) A plurality of functions of a single element in the above-described embodiments may be achieved by a plurality of elements, and a single function of a single element may be achieved by a plurality of elements. Also, a plurality of functions of a plurality of elements may be achieved by a single element, and a single function achieved by a plurality of elements may be achieved by a single element. Further, a part of a configuration in the above-described embodiments may be omitted. Moreover, at least a part of a configuration in the above-described embodiments may be added to, or may be replaced by a configuration in other embodiments.

What is claimed is:

1. A side bracket configured to fasten an end of a steering member to a body of a vehicle, the steering member being mounted on the vehicle with the steering member extending in a vehicle-width direction, the steering member being a stick member to support steering, the side bracket comprising:
    a base having at least one body fastening portion configured to be fastened to the body;
    an inner fastening portion extending from the base toward a rear side, the inner fastening portion having a through hole configured to be penetrated by the steering member;
    an outer fastening portion extending from the base toward the rear side;
    an inner joining part provided on a rim surrounding the through hole in the inner fastening portion so as to surround the through hole, wherein in a position closer to a central side in the vehicle-width direction than the at least one body fastening portion, the inner joining part is configured to be joined to an outer circumferential surface of the steering member penetrating the through hole; and
    an outer joining part provided in the outer fastening portion, wherein in a position closer to an end side in the vehicle-width direction than the at least one body fastening portion, the outer joining part is configured to be joined to a front portion of the outer circumferential surface of the steering member penetrating the through hole,
    wherein the inner fastening portion comprises:
        a front section arranged on a front side of the steering member penetrating the through hole; and
        a rear section arranged on a rear side of the steering member,
    wherein in the front section, a first front attaching part, a second front attaching part, and a front joining part positioned between the first front attaching part and the second front attaching part are provided,
    wherein in the rear section, a first rear attaching part, a second rear attaching part, and a rear joining part positioned between the first rear attaching part and the second rear attaching part are provided,
    wherein by joining the first front attaching part and the first rear attaching part and by joining the second front attaching part and the second rear attaching part, the through hole is formed between a pair of the first front attaching part and the first rear attaching part and a pair of the second front attaching part and the second rear attaching part, and
    wherein the inner joining part is formed by the front joining part and the rear joining part.

2. The side bracket according to claim 1,
wherein the outer joining part is a flange portion.

3. The side bracket according to claim 1,
wherein the inner joining part is a flange portion.

4. The side bracket according to claim 3,
wherein the inner joining part protrudes from the rim surrounding the through hole in the inner fastening portion toward the central side in the vehicle-width direction.

5. The side bracket according to claim 1,
wherein the first front attaching part, the second front attaching part, the first rear attaching part, and the second rear attaching part are flange portions.

6. The side bracket according to claim 5,
wherein the first front attaching part and the second front attaching part protrude from the front section toward the central side in the vehicle-width direction, and
wherein the first rear attaching part and the second rear attaching part protrude from the rear section toward the central side in the vehicle-width direction.

7. The side bracket according to claim 6,
wherein the front section of the inner fastening portion, the base, and the outer fastening portion are formed by one plate material, and the rear section of the inner fastening portion is formed by one plate material.

8. The side bracket according to claim 1,
wherein a portion of the outer circumferential surface of the steering member to which the front joining part is joined is positioned in front of a portion of the outer circumferential surface to which the rear joining part is joined.

9. The side bracket according to claim 8,
wherein the inner joining part is a flange portion.

10. The side bracket according to claim 9,
wherein the inner joining part protrudes from the rim surrounding the through hole in the inner fastening portion toward the central side in the vehicle-width direction.

11. The side bracket according to claim 8,
wherein the front section of the inner fastening portion, the base, and the outer fastening portion are formed by one plate material, and the rear section of the inner fastening portion is formed by one plate material.

12. The side bracket according to claim 1,
wherein the base has at least two body fastening portions including an upper side body fastening portion and a lower side body fastening portion,
wherein the upper side body fastening portion is positioned on an upper side of the steering member penetrating the through hole in the inner fastening portion, wherein the lower side body fastening portion is positioned on a lower side of the steering member.

13. The side bracket according to claim 1,
wherein the front section of the inner fastening portion, the base, and the outer fastening portion are formed by one plate material, and the rear section of the inner fastening portion is formed by one plate material.

14. The side bracket according to claim 1,
wherein the inner fastening portion is a plate-like portion substantially orthogonal to the vehicle-width direction.

15. The side bracket according to claim 1,
wherein the outer fastening portion is a plate-like portion substantially orthogonal to the vehicle-width direction.

\* \* \* \* \*